United States Patent [19]
Farley

[11] Patent Number: 5,346,429
[45] Date of Patent: Sep. 13, 1994

[54] FEEDER ASSEMBLY FOR A COMBINE

[75] Inventor: Herb M. Farley, Braidwood, Ill.

[73] Assignee: Case Corporation, Racine, Wis.

[21] Appl. No.: 21,770

[22] Filed: Feb. 24, 1993

[51] Int. Cl.⁵ .................. A01D 75/18; A01F 12/00
[52] U.S. Cl. ........................... 460/16; 56/119; 460/70; 474/91; 474/140
[58] Field of Search .................. 460/70, 114, 16; 474/91, 94, 140; 56/59, 66, 69, 75, 78, 82, 88, 93, 106, 108, 118, 119

[56] References Cited
U.S. PATENT DOCUMENTS

| | | |
|---|---|---|
| 3,216,267 | 11/1965 | Dolza .................. 474/94 |
| 3,576,188 | 4/1971 | Tanis ................. 130/27 JT |
| 3,643,666 | 2/1972 | Denison ............. 130/27 JT |
| 3,648,709 | 3/1972 | DeCoene ........... 130/27 JT |
| 3,779,251 | 12/1973 | Rowland-Hill et al. ...... 130/27 JT |
| 3,827,443 | 8/1974 | Drayer ............... 130/27 T |
| 4,170,235 | 10/1979 | Ashton et al. ..... 130/27 T |
| 4,194,413 | 3/1980 | Hentze ............... 474/91 |
| 4,209,024 | 6/1980 | Powell et al. ..... 130/27 T |
| 4,266,560 | 5/1981 | Powell et al. ..... 130/27 T |
| 4,343,137 | 8/1982 | Seymour ............. 56/10.2 |
| 4,440,179 | 4/1984 | Bassett et al. .... 130/27 JT |
| 4,474,188 | 10/1984 | Kashino et al. ... 130/27 H |
| 4,505,279 | 3/1985 | Campbell et al. .. 130/27 T |
| 4,752,279 | 6/1988 | Ogino ................. 474/91 |
| 4,805,388 | 2/1989 | Kell ...................... 56/98 |
| 4,889,517 | 12/1989 | Strong et al. ...... 460/66 |
| 4,900,290 | 2/1990 | Tanis .................. 460/70 |
| 5,045,032 | 9/1991 | Suzuki et al. ...... 474/140 |

Primary Examiner—Terry Lee Melius
Attorney, Agent, or Firm—Rudnick & Wolfe

[57] ABSTRACT

A feeder assembly for a combine including a conveyor having a plurality of laterally spaced driving chains entrained about and supported by a pair of for-and-aft spaced lateral supports. An elastomeric assembly is removably fitted about and is adapted for rotation with one of the supports to define a replaceable wear surface for the support while attenuating noise generated by the feeder assembly during operation thereof.

17 Claims, 3 Drawing Sheets

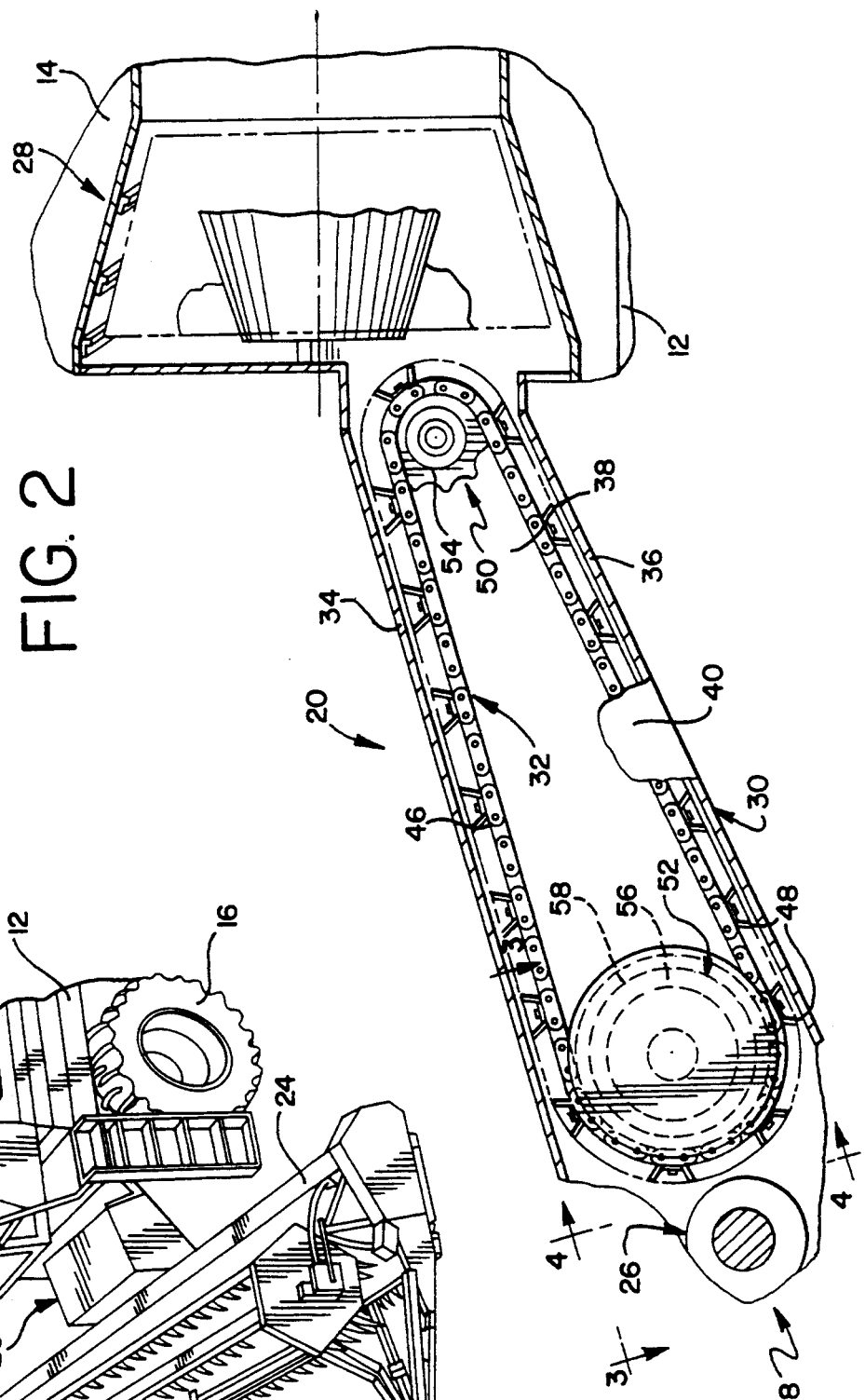

FEEDER ASSEMBLY FOR A COMBINE

FIELD OF THE INVENTION

The present invention generally relates to a feeder assembly for a combine and, more practically, to an apparatus for reducing noise and wear of the feeder assembly.

BACKGROUND OF THE INVENTION

Agricultural combines typically include a header assembly which severs crop materials close to the ground as the combine is driven across a field. A feeder assembly moves the severed crop materials from the header assembly toward a threshing area of the combine.

A conventional feeder assembly includes a plurality of fore-and-aft extending side-by-side flexible belts or drive chains which are tensioned and move in unison relative to each other. A series of laterally elongated slats or crossbars are typically connected to and span the lateral distance between the driving chains. As the chains are driven, the slats engage and move crop materials from one level in the combine to a higher level. The driving chains are entrained for orbital movement about a pair of fore-and-aft spaced metal chain supports. Each chain is comprised of a multiple of metal parts including side plates, brackets, pins and bushings, and miscellaneous linkage parts.

Maintenance problems with known feeder assemblies have resulted from wear on the chains and the chain supports about which they are entrained. As will be appreciated, tensioning of the drive chains coupled with the metal-to-metal sliding contact between the chain and the supports causes wear on adjacent surfaces and can result in malfunctions of the feeder assembly. Repairs and/or replacement of either support and/or the driving chains require dismantling of the feeder assembly and, thus, necessitates a substantial "down time" for the combine. Known mechanical chain conveyors are further objectionably noisy. The noise created during operation of the feeder assembly is exacerbated when the chain supports are configured as laterally elongated hollow drums.

Thus, there is a need and a desire for a feeder assembly which is designed to improve durability of the feeder assembly and to attenuate the noise generated during operation of the feeder assembly.

SUMMARY OF THE INVENTION

In view of the above, and in accordance with the present invention, there is provided a combine feeder assembly having enhanced durability and advantageously offers a significant reduction in the noise generated during operation of the feeder assembly. The feeder assembly includes a conveyor having a plurality of laterally spaced driving chains entrained about and supported by a pair of fore-and-aft spaced chain supports. According to the present invention, an annular assembly is removably fitted about and is adapted for rotation with at least one of the chain supports. The annular assembly includes an endless outer surface which engages the driving chains and defines a replaceable wear surface for the respective chain support thereby prolonging the useful life of the feeder assembly.

In a preferred form of the invention, the annular assembly which defines the replaceable wear surface for the chain support includes a plurality of cylindrically shaped members fitted circumferentially about and along the outer surface of the chain support. To facilitate assembly, the outer surface of the chain support having the cylindrical members fitted thereover has a substantially constant cross-sectional configuration between opposite ends thereof.

In a most preferred form of the invention, the cylindrically shaped members provided along the length of the chain support are each formed from an elastomeric material. Each elastomeric member is free of fasteners and is sized to establish a frictional fit between an inner surface of the member and an outer surface of the respective chain support thereby effecting simultaneous rotation between the respective chain support and the elastomeric member.

Each of the driving chains of the conveyor assembly are tensioned and include a plurality of corresponding laterally spaced links which are articulately connected by pin and bushing assemblies. Moreover, the outer surface of the annular assembly has a profiled configuration. In a most preferred form of the invention, the profiled configuration of the annular assembly includes annular chain supporting rims which engage and provide support to the pin and bushing assemblies of the driving chains thereby broadly distributing chain tension loading and thus reducing wear of the chains as they rotate about the respective chain support.

An advantage of this invention concerns the provision of a replaceable chain supporting wear surface for the driving chains of the feeder assembly thereby reducing maintenance requirements. Moreover, forming the chain supporting wear surface from an annular elastomeric material having an outer resilient surface which engages the chains as they pass about the chain support considerably dampens the noise generated by the chains during operation of the feeder assembly. Configuring the annular assembly with annular rims which resiliently engage the pin and bushing assemblies of the driving chains furthermore serves to broadly distribute chain tension loading and thus reduce wear of the driving chains during operation. Configuring the annular assembly to establish a frictional fit eliminates the need for numerous fasteners which would complicate the design and are subject to wear and, therefore, malfunctions. Moreover, configuring the annular assembly from a material softer than the steel driving chains yields an economical and effective method for substantially reducing noises emanating from the driving chains during operation of the feeder assembly.

Numerous other features and advantages of the present invention will become readily apparent from the following detailed description, the accompanying drawings, and the appended claims.

BRIEF DESCRIPTION OF THE DRAWINGS

FIG. 1 is a fragmentary perspective view of a combine embodying principles of the present invention;

FIG. 2 is a fragmentary vertical sectional view of a combine feeder assembly according to the present invention;

DETAILED DESCRIPTION OF THE INVENTION

Figure 3:
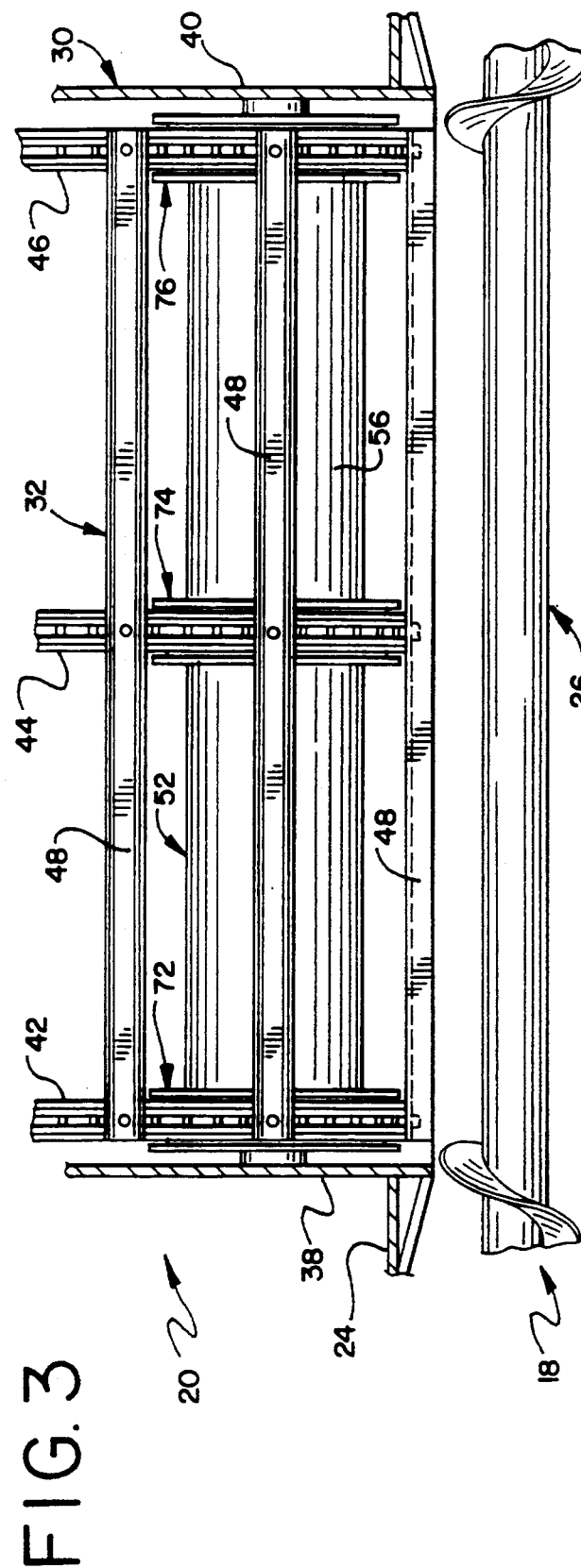
FIG. 3 is a fragmentary and generally horizontal sectional view of a forward end of a combine feeder assembly according to the present invention.

While the present invention is susceptible of embodiment in various forms, there is shown in the drawings, and will hereinafter be described, a presently preferred embodiment of the invention with the understanding that the disclosure is to be considered as an exemplification of the invention which is not intended to limit the invention to the specific embodiment illustrated.

Referring now to the drawings, wherein like reference numerals indicate like parts throughout the several views, there is shown a self-propelled combine which is depicted only fragmentarily in FIG. 1 and is seen as represented in its entirety by reference numeral 10. Combine 10 includes a frame 12 with a body 14 supported on a pair of ground engaging front drive wheels 16 and a pair of steerable rear wheels (not shown). At its forward end, combine 10 includes a header assembly 18 and a feeder assembly 20. In accordance with normal combine construction, the header assembly includes a reel 22 which is rotatably mounted on a housing 24 to harvest crop material.

As shown in FIG. 2, the feeder assembly 20 operates to move or convey crop materials between a consolidating auger 26 of the header assembly and a threshing assembly 28 arranged within the body 14 of the combine. The threshing assembly 28 illustrated in the drawings is of the rotary type which embodies threshing and separating means in a single unit. It should be appreciated, however, that the feeder assembly 20 of the present invention is equally applicable to other type combines having different types of threshing arrangements.

The feeder assembly 20 of the present invention includes a feeder-housing 30 which envelops and has mounted therein a conveyor assembly 32. The feeder housing 30 is joined at a forward end and opens to the header assembly 18. Toward a rear end, the feeder housing 30 is pivotally connected to the frame 12 of the combine so as to permit simultaneous vertical elevation of the header assembly 18 and feeder assembly 20. In the illustrated embodiment, the feeder housing 30 includes top and bottom walls 34 and 36, respectively, which are joined by side walls 38 and 40 to define an enclosure which envelops the conveyor assembly 32.

Figure 4:
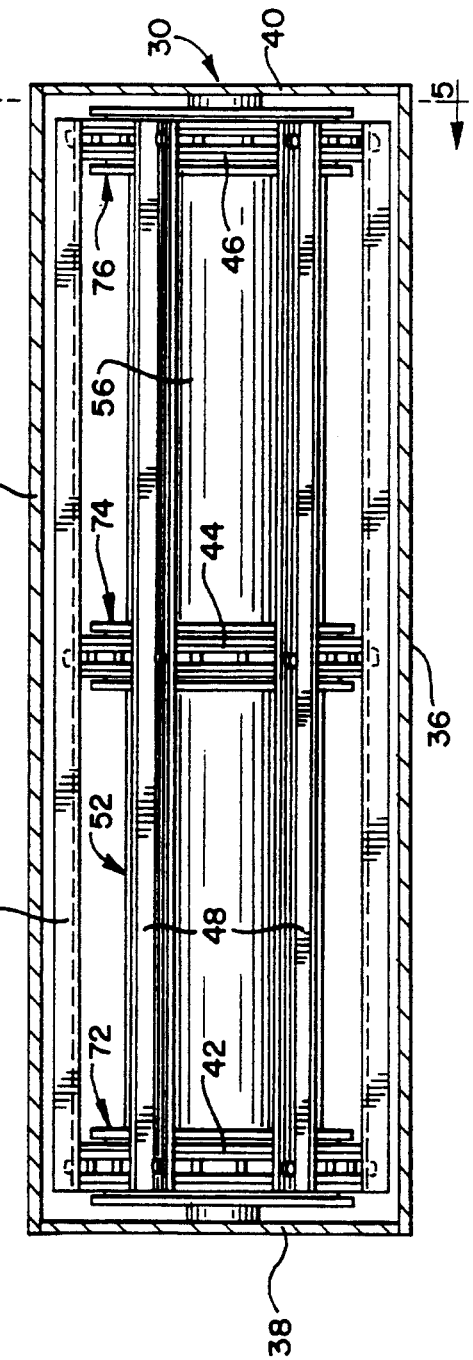
FIG. 4 is a sectional view taken along line 4—4 of FIG. 2.

As is conventional, the conveyor assembly 32 of the feeder assembly 20 receives crop materials from the header assembly 18 at a forward end and discharges the crop material at a different elevational level for additional processing at a rearward end. As shown in FIGS. 3 and 4, the conveyor assembly 32 includes a plurality of laterally spaced and tensioned endless chains 42, 44 and 46 having a series of laterally elongated slats or crossbars 48 which span the lateral distance between the chains 42, 44 and 46. The slats 48 are connected in a conventional manner to the chains 42, 44 and 46 so as to be driven thereby. As shown in FIG. 2, the endless chains 42, 44 and 46 are entrained for orbital rotation about a pair of fore-and-aft spaced chain supports 50 and 52.

In the illustrated embodiment, support 50 defines a rotary drive member including a plurality of laterally spaced sprockets 54 provided along the length thereof for driving the chains 42, 44 and 46 in unison relative to each other. Chain support 52 serves as a idler roller. In the illustrated embodiment, chain support 52 is configured as a laterally elongated hollow tube 56 having a substantially constant cross-sectional configuration and an outer surface 58.

Each of the chains 42, 44 and 46 have corresponding sections which extend generally parallel to each other. Moreover, each chain 42, 44 and 46 of the conveyor assembly 32 is of substantially similar construction. Accordingly, a description of the construction of one chain will be understood to be equally applicable to all the chains.

Figure 5:
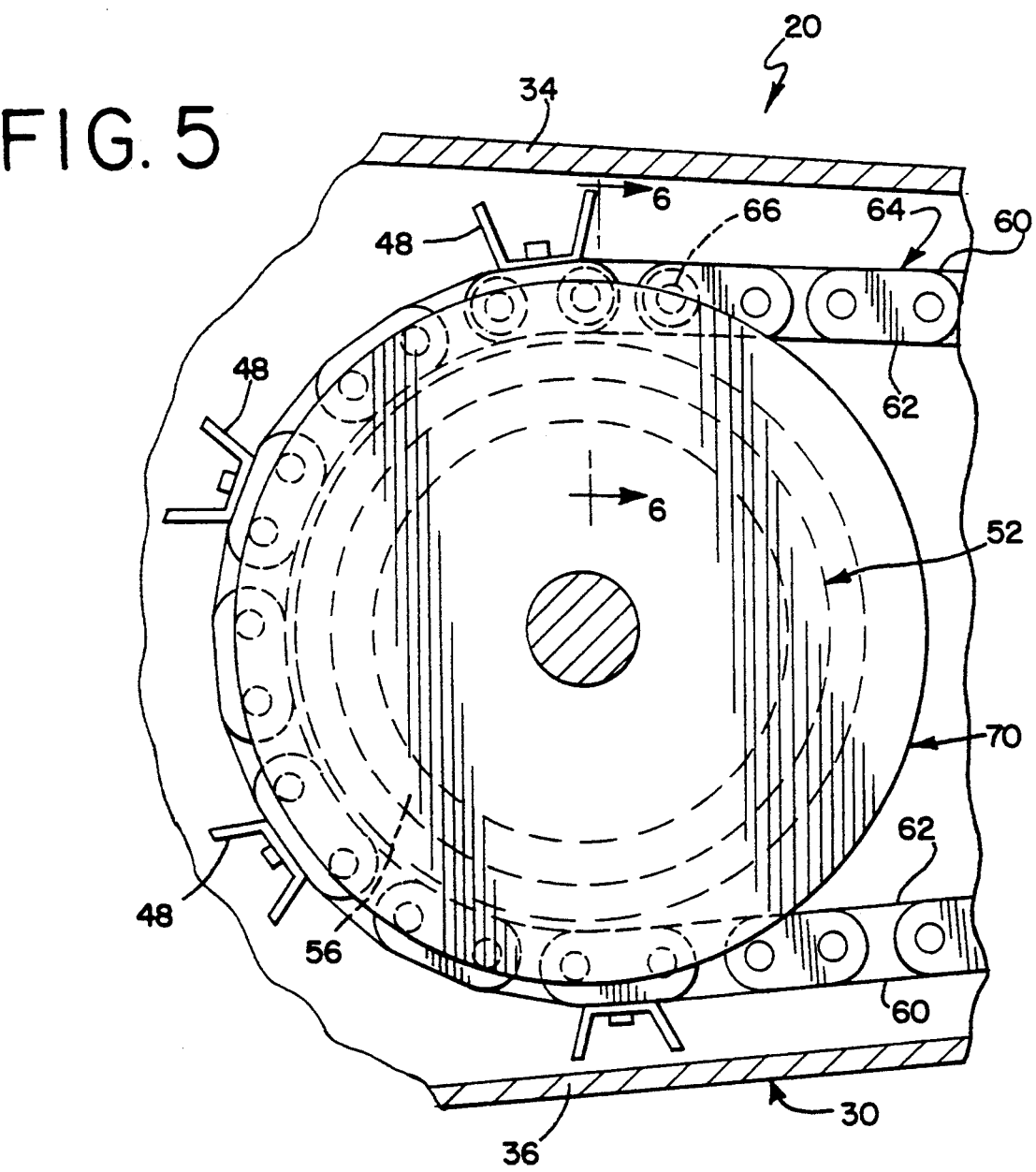
FIG. 5 is a enlarged side elevational view taken along line 5—5 of FIG. 4.

As shown in FIG. 5, each chain defines first and second vertically spaced surfaces 60 and 62, respectively. Notably, the slats or crossbars 48 extend vertically beyond the outer or first surface 60 of each chain section. Each chain includes a plurality of interconnected steel links generally designated 64. As is well known, each link 64 is formed of laterally spaced elements arranged in generally parallel fashion and which are articulately connected to each other by a pin and bushing assembly 66.

According to the present invention, a noise attenuating assembly 70 is disposed circumferentially about the outer surface 58 of chain support 52 to alter the wear thereof and to substantially reduce noise generation as the driving chains 42, 44 and 46 move thereabout. In the preferred form of the invention, assembly 70 includes a plurality of annularly formed sleeves or members 72, 74 and 76 which are laterally arranged along the length of chain support 52 to engage the second or underside surface 62 of each chain 42, 44 and 46.

Each sleeve 72, 74 and 76 is made of a material which is softer than that of the drive chains 42, 44 and 46. In a preferred form of the invention, each sleeve is advantageously formed of a natural rubber material. Other elastomeric materials such as a rubber composition or a urethane composition or compound which is suitable for the environmental conditions and has a durometer hardness sufficient to allow compression thereof by the respective chain assembly passing thereabout are alternative forms of materials which would suffice to provide the desired wear and dampening affect of the present invention.

Figure 6:
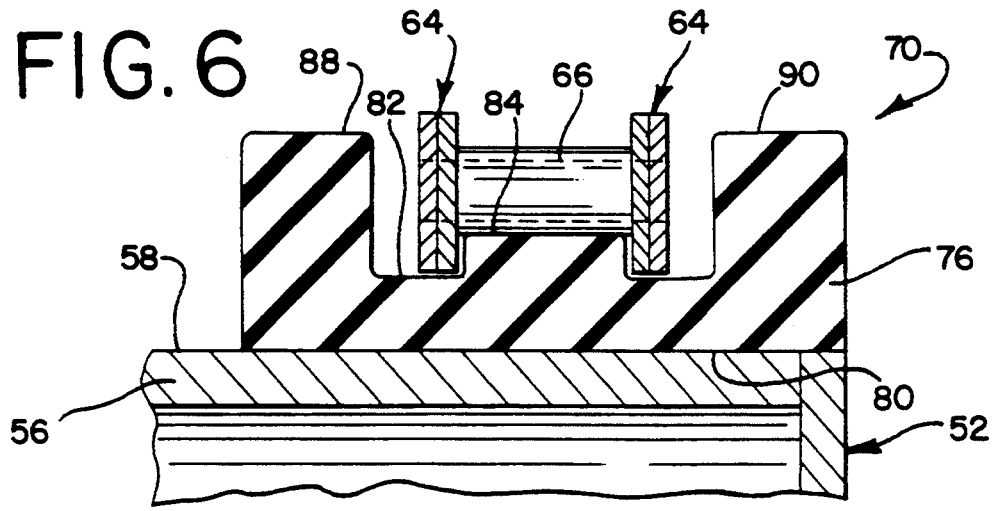
FIG. 6 is a sectional view taken along line 6—6 of FIG. 5.

In the preferred embodiment, each sleeve 72, 74 and 76 is substantially identical to the other. Accordingly, a description of sleeve 76 will suffice for an understanding of all the sleeves. As shown in FIG. 6, each sleeve is sized to establish a frictional fit relationship between an inner surface 80 of the respective sleeve and the outer surface 58 of the chain support 52 thereby effecting simultaneous rotation therebetween. Moreover, establishing a frictional fit between each sleeve and the chain support eliminates the need for fasteners to hold the sleeve to the support thereby facilitating replacement of the sleeves when required.

As shown, each sleeve is preferably formed with a profiled outer annular chain engaging surface area 82. More specifically, each sleeve is provided with a central annular chain supporting rim 84 having a first predetermined diameter which engages and provides support to the pin and bushing assemblies 66 of the respective driving chains thereby broadly distributing chain tension loading and thus reducing wear of the chains as they rotate about the respective rotary member. In the preferred form of the invention, the outer surface of each sleeve of assembly 70 is further provided with laterally spaced annular rims 88 and 90 having a second predetermined diameter and arranged on opposite and outward sides of the elements of each driving chain supported thereby.

Assembly 70 of the present invention offers several distinct advantages from the prior art. First, it offers a readily replaceable wear surface for the chain support about which the driving chains move. Moreover, assembly 70 can be readily fitted to existing equipment. Also, because the annular member is preferably formed from an elastomeric material, it engages the chains and dampens contact noise between the chains and the respective chain support thereby reducing noise generation as the chains move about the respective support. Providing each annular member of the annular assembly with a central chain supporting rim which engages and provides support to the pin and bushing assemblies of the respective driving chains thereby broadly distributes chain tension loading and thus reduces wear on the chains as they rotate about the support. In addition to attenuating the noise generated by the feeder assembly during operation, reducing the wear on the driving chains reduces maintenance requirements and prolongs the useful life of the feeder assembly thereby enhancing operation of the combine through economical means.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A feeder assembly for a combine, said feeder assembly for a combine. said feeder assembly comprising:
   at least two laterally spaced endless metal chains having laterally elongated material engaging slats driven thereby;
   first and second laterally elongated chain supports arranged in fore-and-aft spaced relation relative to each other and about which the metal chains orbitally move in unison relative to each other, said first support having laterally spaced sprockets arranged in driving relation relative to said metal chains and with the second support defining a relatively smooth metal outer surface between opposite ends thereof; and
   an annularly formed elastomeric assembly non-rotatably fitted between the smooth outer metal surface of the second support and each of said metal chains to dampen contact noise between the melt chains and the support thereby reducing noise generation as the chains move thereabout.

2. The feeder assembly according to claim 1 wherein the relatively smooth outer surface of the second support about which the elastomeric assembly is fitted has a substantially constant cross sectional configuration between opposite ends thereof to facilitate sliding movement of the elastomeric assembly thereover.

3. The feeder assembly according to claim 2 wherein the relatively smooth outer surface of the second support having the elastomeric assembly fitted thereover has a cylindrical cross-sectional configuration thereby facilitating sliding replacement of the elastomeric assembly.

4. The feeder assembly according to claim 1 wherein said elastomeric assembly is free of fasteners and is sized to establish a frictional fit between an inner surface thereof and the relatively smooth metal outer surface of the second chain support thereby effecting simultaneous rotation between the second support and the elastomeric assembly.

5. The feeder assembly according to claim 1 wherein said elastomeric assembly is formed with a profiled outer annular chain engaging surface area including a plurality of annularly shaped ridges radially extending from an outer surface of the elastomeric assembly.

6. A feeder assembly for a combine, said feeder assembly comprising:
   a fore-and-aft elongated conveyor including at least two tensioned and laterally spaced endless driving metal chains having a plurality of feeder slats spanning the lateral distance between and connected to the driving chains;
   front and rear metal supports for supporting each of said driving chains for movement thereabout, said rear metal Support including laterally spaced sprockets arranged in driving engagement with said metal chains and with said front support having a relatively smooth metal outer surface between opposite ends thereof;
   an elastomeric assembly which slides circumferentially over and along to frictionally engage the outer metal surface of said front support, said elastomeric assembly having an outer surface which resiliently engages an underside of the chains as they pass about the front support.

7. The feeder assembly according to claim 6 wherein each driving chain includes a plurality of corresponding laterally spaced elements which are articulately interconnected by a pin and bushing assembly.

8. The feeder assembly according to claim 7 wherein the outer surface of the elastomeric assembly has a profiled configuration including annular chain supporting rims which engage and provide support to the pin and bushing assemblies of the driving chains thereby broadly distributing chain tension loading and thus reducing wear of the chains as they rotate about the respective support.

9. The feeder assembly according to claim 7 wherein the outer surface of said elastomeric assembly defines laterally spaced annular rims arranged on opposite and outward sides of the elements of each driving chain supported thereby.

10. The feeder assembly according to claim 6 wherein the outer surface of the front support over which the elastomeric assembly slides has a substantially continuous cylindrical configuration to facilitate replacement of the elastomeric assembly thereby reducing wear on the front support about which the chains rotate.

11. A feeder assembly for a combine, said feeder assembly comprising:
   first and second metal drive chains having corresponding sections extending generally parallel to each other, each chain section defining at least a first surface and a second surface Spaced from said first surface;
   a plurality of laterally elongated feeder slats connected to and driven by said chains, each feeder slat extending beyond the first surface of the chain sections;
   a housing which envelopes said drive chains and feeder slats:

first and second metal supports connected to said housing for supporting said chains for movement thereabout, said first support including sprockets for imparting endwise movements to said metal chains and said second support defining a relatively smooth outer cylindrical metal surface along the length thereof; and a plurality of annularly formed elastomeric members fitted between the outer cylindrical metal surface of said second support and the second surface of the chain sections that move about the second support thereby dampening contact noise between the metal chains and the second support.

12. The feeder assembly according to claim 11 wherein each driving chain includes a plurality of links which engage and compress against an outer annular surface of a respective elastomeric member as the driving chains pass about said second support.

13. The feeder assembly according to claim 11 wherein each elastomeric member has a profiled outer annular surface for engaging a respective driving chain.

14. The feeder assembly according to claim 13 wherein the profiled outer annular surface of the elastomeric member includes two annular outer rims of a first predetermined diameter and a central annular rim of a second predetermined diameter.

15. A feeder assembly for a combine, said feeder assembly comprising:

a conveyor including a plurality of side-by-side metal driving chains movable in unison relative to each other;

a housing which envelopes said conveyor;

first and second fore-and-aft spaced laterally elongated metal supports connected to said housing for supporting said metal chains for movement thereabout, said first support including laterally spaced sprockets for driving said metal chains in unison relative to each other and said second support defining a relatively smooth outer cylindrical surface; and an annularly shaped elastomeric member disposed between each metal chain and said second support each elastomeric member having a smooth cylindrical inner surface sized to establish a frictional fit with the outer cylindrical surface of said second support to inhibit relative rotational movement therebetween and an outer surface provided with a profiled configuration for engaging said metal chains and thereby reducing the noise generated by the metal chains moving about the second support.

16. The feeder assembly according to claim 15 wherein said second support comprises a laterally elongated tubular member having a substantially constant cross sectional configuration extending between opposite ends thereof.

17. The feeder assembly according to claim 15 wherein each elastomeric member is formed from a material of the class consisting of natural rubber, blended rubber compositions, and urethane.

* * * * *